United States Patent
Liang et al.

(10) Patent No.: US 11,252,277 B2
(45) Date of Patent: Feb. 15, 2022

(54) DYNAMIC ANTI-DISTURB TECHNIQUES IN TELEPHONY

(71) Applicant: International Business Machines Corporation, Armonk, NY (US)

(72) Inventors: Yong Fang Liang, Beijing (CN); Yi Bin Wang, Beijing (CN); Ya Pei Zhou, Beijing (CN); Ting Cao, Beijing (CN); Li Ni Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 16/691,704

(22) Filed: Nov. 22, 2019

(65) Prior Publication Data

US 2021/0160368 A1    May 27, 2021

(51) Int. Cl.
| | |
|---|---|
| *H04M 3/436* | (2006.01) |
| *G06Q 30/02* | (2012.01) |
| *G06N 20/00* | (2019.01) |
| *G06N 7/00* | (2006.01) |
| *H04L 29/06* | (2006.01) |
| *H04M 1/72454* | (2021.01) |

(52) U.S. Cl.
CPC ............ *H04M 3/436* (2013.01); *G06N 7/00* (2013.01); *G06N 20/00* (2019.01); *G06Q 30/0203* (2013.01); *H04L 65/1079* (2013.01); *H04M 1/72454* (2021.01); *H04M 2203/2033* (2013.01); *H04M 2203/2038* (2013.01); *H04M 2203/558* (2013.01); *H04M 2203/655* (2013.01)

(58) Field of Classification Search
CPC ...... G06N 7/00; G06N 20/00; G06Q 30/0203; H04L 65/1079; H04M 1/72454; H04M 3/436; H04M 2203/2033; H04M 2203/2038; H04M 2203/558; H04M 2203/655

USPC ................................ 379/210.02, 210.03
See application file for complete search history.

(56) References Cited

U.S. PATENT DOCUMENTS

| | | | |
|---|---|---|---|
| 7,295,660 B1 * | 11/2007 | Higginbotham | H04M 3/436 379/196 |
| 9,509,821 B2 | 11/2016 | Zhekov | |
| 10,097,687 B2 | 10/2018 | Hayakawa | |
| 10,111,102 B2 | 10/2018 | Flaks | |
| 10,135,976 B2 | 11/2018 | Farrand | |
| 2002/0085700 A1 | 7/2002 | Metcalf | |
| 2012/0309365 A1 | 12/2012 | Wang | |

(Continued)

FOREIGN PATENT DOCUMENTS

CN    104601782 A    5/2015

OTHER PUBLICATIONS

Azad, et al., "Multistage SPIT detection in transit VoIP", 19th International Conference on Software, Telecommunications and Computer Networks, SoftCOM 2011, 9 pages.

(Continued)

*Primary Examiner* — Harry S Hong (74) *Attorney, Agent, or Firm* — Stephen R. Yoder (57) ABSTRACT

Filtering incoming calls according to predicted preferences of a user. User preferences are predicted by analysis of user behavior, online activity, oral queues, and purchasing history. Data analysis includes weighting caller and user attributes according to a scheme that is dynamically updated by applying user feedback and/or machine learning processes.

20 Claims, 8 Drawing Sheets

(56) References Cited

U.S. PATENT DOCUMENTS

| | | | |
|---|---|---|---|
| 2013/0156176 A1* | 6/2013 | Smith | H04M 3/42153 |
| | | | 379/210.02 |
| 2016/0065712 A1 | 3/2016 | Zhekov | |
| 2016/0150414 A1 | 5/2016 | Flaks | |
| 2016/0323446 A1 | 11/2016 | Farrand | |
| 2017/0064076 A1 | 3/2017 | Hayakawa | |
| 2018/0060496 A1 | 3/2018 | Bulleit | |
| 2018/0152558 A1* | 5/2018 | Chan | H04W 4/16 |
| 2019/0373110 A1* | 12/2019 | Chan | H04M 3/436 |
| 2021/0289071 A1* | 9/2021 | Way | G06Q 20/3223 |

OTHER PUBLICATIONS

Kolan, et al., "Nuisance Level of a Voice Call", ACM Transactions on Multimedia Computing, Communications and Applications, vol. 5, No. 1, Article 6, Publication date: Oct. 2008, pp. 6:1-6:22.

Leontjeva et al., "Early Security Classification of Skype Users via Machine Learning", Proceedings of the 2013 ACM workshop on Artificial intelligence and security, Nov. 2013, Berlin, Germany, Nov. 4, 2013, pp. 35-44.

Li et al., "A Machine Learning Approach to Prevent Malicious Calls Over Telephony Networks" arxiv.org, Apr. 7, 2018. 17 pages, <https://arxiv.org/pdf/1804.02566.pdf>.

Wu et al., "Spam Detection in Voice-over-IP Calls through Semi-Supervised Clustering", 2009 IEEE/IFIP International Conference on Dependable Systems & Networks, pp. 307-316.

Zhang et al., "Collaborative Reputation-based Voice Spam Filtering", 2009, 20th International Workshop on Database and Expert Systems Application, pp. 33-37.

* cited by examiner

DYNAMIC ANTI-DISTURB TECHNIQUES IN TELEPHONY

BACKGROUND

The present invention relates generally to the field of telephony, and more particularly to anti-disturb techniques in telephony.

Anti-disturb techniques often operate to automatically deny, or block, incoming calls based on a list of phone numbers to deny. Alternatively, anti-disturb techniques are applied on a network level where nuisance callers are identified and prevented from placing calls. This technique may be referred to as a reputation-based technique where it is the reputation of the caller that triggers any anti-disturb actions.

"Spam in telephony" referred to by the acronym SPIT refers to unsolicited, automatically dialed, pre-recorded phone calls often used for marketing or phishing. Advanced detection of SPIT may rely on caller-based information such as personal relationships of the caller to the phone number being called, such as with a person associated with the phone number or certain call-related statistical characteristics of the caller.

Machine learning is the scientific study of algorithms and statistical models that computer systems use to progressively improve their performance on a specific task. Machine learning algorithms build a mathematical model of sample data, known as "training data," for performing tasks such as predicting an outcome or making decisions without being explicitly programmed to perform the particular tasks. Machine learning algorithms are often deployed for applications that do not lend themselves to individual specific instructions to perform each task, such as filtering email messages, detecting network intruders, and supporting computer vision systems. Data mining is a field of study within machine learning having a focus on exploratory data analysis through unsupervised learning.

Data mining is the process of discovering patterns in large data sets by the application of machine learning and statistical analysis. Data mining has an overall goal of extracting information from a data set and transforming the information into a comprehensible structure, such as patterns, to make predictions.

SUMMARY

In one aspect of the present invention, a method, a computer program product, and a system includes: (i) receiving an incoming call; (ii) determining a set of characteristics of the incoming call; (iii) identifying a set of common characteristics where the set of characteristics relate to response modeling data; (iv) assigning, by the processor, a call status to the incoming call based on the common characteristics; and (v) taking a responsive action corresponding to the call status. The response modeling data includes social contacts information and online activity data.

DETAILED DESCRIPTION

Filtering incoming calls according to predicted preferences of a user. User preferences are predicted by analysis of user behavior, online activity, oral queues, and purchasing history. Data analysis includes weighting caller and user attributes according to a scheme that is dynamically updated by applying user feedback and/or machine learning processes. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
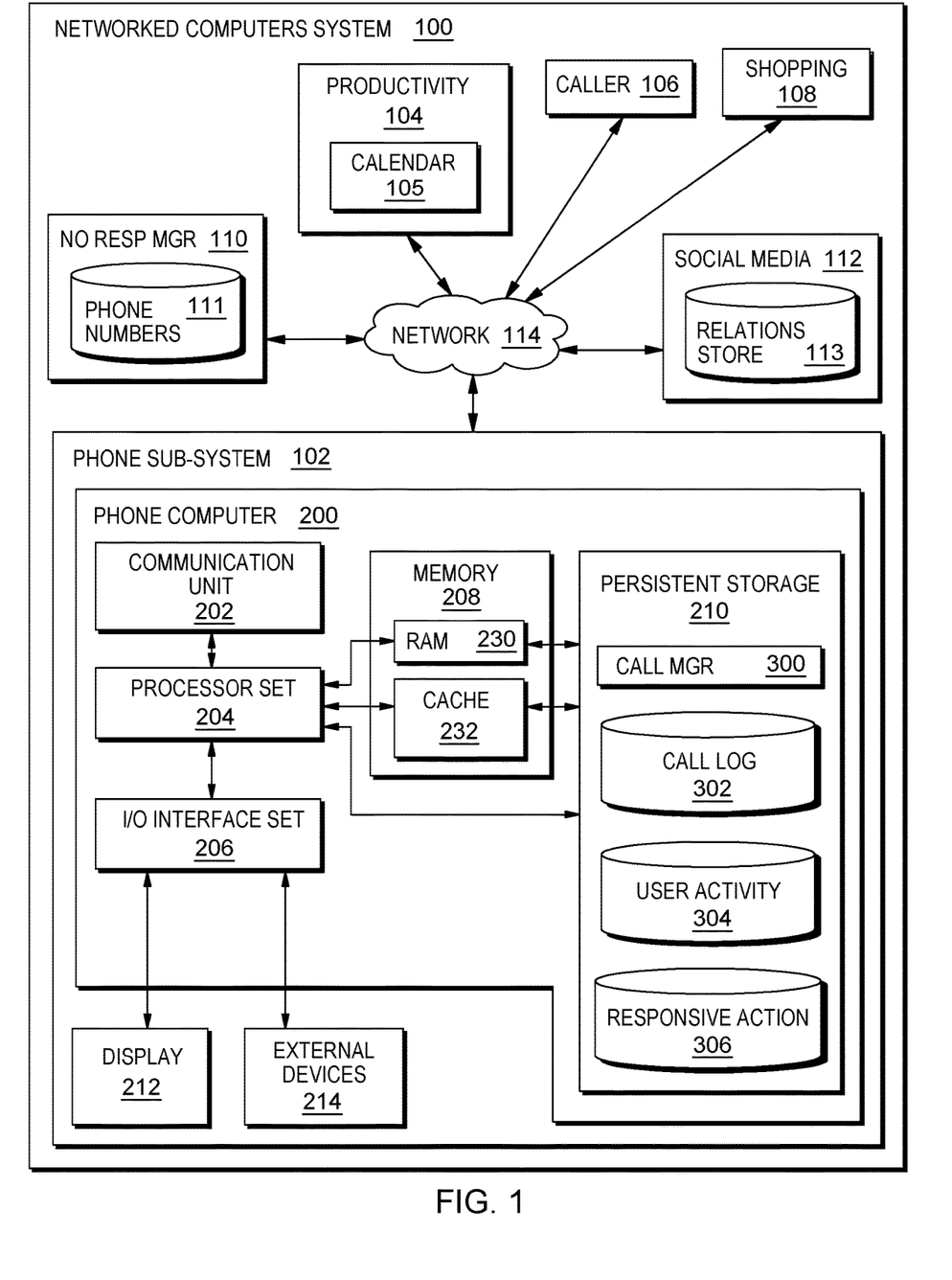
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: phone sub-system 102; productivity sub-system 104; calendar application 105; caller sub-system 106; online shopping sub-system 108; do-not-answer manager sub-system 110; phone numbers store 111; social medial sub-system 112; social relationships store 113; communication network 114; phone computer 200; communication unit 202; processor set 204; input/output (I/O) interface set 206; memory device 208; persistent storage device 210; display device 212; external device set 214; random access memory (RAM) devices 230; cache memory device 232; call manager program 300; call log 302; user activity store 304; and responsive actions database 306.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
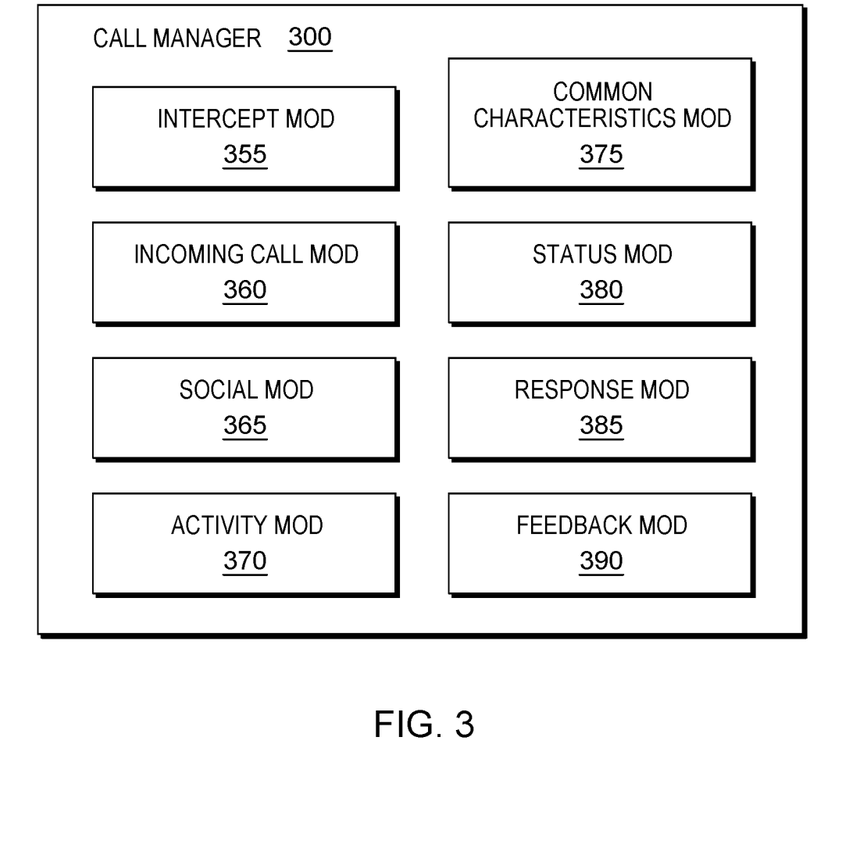
FIG. 3 is a schematic view of a machine logic (for example, software) portion of the first embodiment system.

Call manager program 300 operates to hold incoming calls for a determination of a responsive action. Responsive actions include hanging up, sending the call to voicemail, and allowing the call to reach the user. Analysis is performed on the incoming call characteristics in view of available responsive models including social relationships data, online shopping data, non-responsive call history, and user-specific instructions. According to some embodiments of the present invention responsive models are generated using call history data including call previously answered by a user.

As used herein, the terms "incoming call," "telephone call," "phone call," or, simply, "call" refers to any attempted or achieved voice communication over a telecommunications network, such as a public switched telephone network (PSTN), other wireline network, or wireless network, or internet protocol based communication network, such as voice over internet protocol (VoIP) or session initiation protocol (SIP).

Some embodiments of the present invention collect data from various sources to support a determination of an unwanted incoming call. Collection and storage of the data is expected to be performed according to ethical standards at least represented by governing laws for data collection and storage. Additionally, some embodiments of the present invention provide notice to users about data collection through terms of use such that the user may opt-in or opt-out of certain data collection methods. Further, to the extent that collected data represents personal information, secure storage and handling of personal information is expected to be performed at least to the degree required by governing laws for collecting and storing personal information.

According to some embodiments of the present invention participating parties will have consented to having their images captured, uploaded, and/or saved and to having their activity recorded and/or monitored. Participating parties are made aware of the likelihood that recording and monitoring activities may take place. Some embodiments of the present invention provide users with terms and conditions and enable users to opt-in or opt-out of participation.

Some embodiments of the present invention recognize the following facts, potential problems and/or potential areas for improvement with respect to the current state of the art: (i) some anti-disturb techniques are set up according to explicit user choice; (ii) conventionally calling patterns between a caller and a particular phone number provide insight into nuisance call determination; (iii) real-time voice and video calls may are oftentimes considered to be a nuisance and undesirable; (iv) do-not-disturb lists often include contacts that a user may sometime want to hear from; and/or (v) network based blocking systems may operate to block a call that a particular user wants to receive even though many others do not want to receive their calls.

Figure 2:
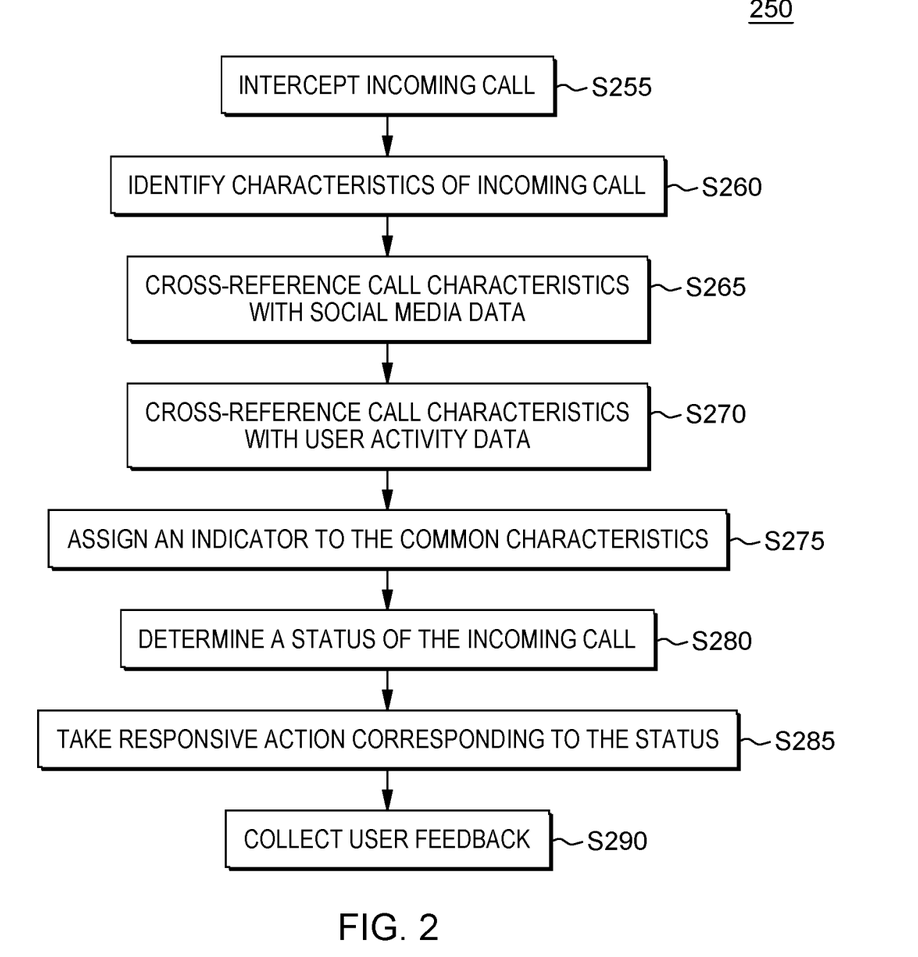
FIG. 2 is a flowchart showing a method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where intercept module ("mod") 305 intercepts an incoming telephone call. By intercepting the call, the intercept module prevents the call from reaching the user so that the incoming call information may be considered for an automated responsive action such as sending the call the voicemail without notifying the user of the incoming call. In this example, an intercepted call is placed on hold. Alternatively, the call is not answered during the intercepting process, but is blocked from reaching the user via the user device for handling phone calls. In some embodiments of the present invention the user is unaware of the incoming call until call manager program 300 takes a responsive action. Alternatively, the caller is aware of the incoming call and may actively send the incoming call to the call manager program, for example, by engaging the intercept mod for intercepting the incoming call. Alternatively, only cold calls are intercepted while phone numbers associated with previously answered calls are allowed to reach the user, who may, according to some embodiments, send the incoming call to the call manager program for handling. A cold call as used herein refers to a call from a phone number that is not recorded as being previously answered by the user. Where cold calls are distinguished, other calls answered by the user and rejected by the user, whether by hanging up quickly, recording the number to a no-not-answer list, or otherwise indicating an unwanted call, may be handled by the call manager when analysis of the incoming call is authorized by the user.

Processing proceeds to step S260, where incoming call mod 360 identifies characteristics of the incoming call. Characteristics may include, but are not limited to: (i) phone number; (ii) caller ID information; (iii) origin of call; (iv) time of call; (v) day of call; (vi) previously received call; and/or (vii) previously called by user. Characteristics may be identified by incoming call metadata and information stored in call log 302 (FIG. 1) where previously received calls are stored along with any additional data input by the user.

Processing proceeds to step S265, where social media mod 365 cross-references the identified call characteristics with social media data. In this example, social media relationship data is stored in relations store 113 (FIG. 1). For example, when the called ID includes a name of the caller and the same name appears in the relations store, a relationship is identifiable and the name is a common characteristic. Further, the characteristic "previously received call" may be matched to a previous social media post. If the incoming call is proximate in time with a similar social media post, the common characteristic of the incoming call and the social media data is "previously received call." Alternatively, social media accounts are accessed by the social media mod to identify relationship data for cross referencing. For each social contact having matching characteristics of the identified call characteristics, the characteristic is tagged as a common characteristic with the corresponding contact. Social media data may include, for example, social media posts and messages created by the user, social media contacts, phone contact lists, received messages, and/or corresponding social media platform (origin) of the data.

Some embodiments of the present invention process social media data with indicators as to call status when matched to an incoming call. Data analysis on social media data may indicate that a particular contact is in frequent contact with the user or that positive communication history exists with a particular contact. In that way, when the social contact shares common characteristics with the incoming call, the suggested responsive action would be to send the call to the user. On the other hand, a social contact identified as a sales contact and having common characteristics with the incoming call may have a suggested responsive action of sending the incoming call to voicemail. Some embodiments of the present invention that are directed to social media data having indicators apply the indicators via common characteristics mod 375 discussed at step S275, below.

Processing proceeds to step S270, where activity mod 370 cross-references the identified call characteristics with user activity data. Activity data broadly covers any online activity of the user. In some embodiments, activity data is maintained for a pre-determined period of time. Alternatively, activity data is time-stamped and the age of the activity data is one determining point for taking a responsive action, for example, the activity data may be weighted by age of the data. Activity data may include and is not limited to: (i) purchases; (ii) browsing history; (iii) email communications; (iv) online shopping cart contents; (v) chat transcripts; (vi) travel booking activity; (vii) dining recommendations/ratings; and/or (viii) social event postings. Common characteristics of the activities and the incoming call are recorded for use in determining a call status.

Processing proceeds to step S275 where common characteristics mod 375 assigns an indicator to the common characteristics identified in steps S265 and S270. Common characteristics are identified with reference to social media data and with reference to user activity data. In this example, an indicator is associated with each stored characteristic that is matched to an incoming call characteristic. The various indicators are recorded. Alternatively, an indicator is assigned to the most frequently appearing common characteristic. Alternatively, an indicator is assigned to each set of common characteristics according to a pre-defined set of characteristics that indicate a particular call status. Indicators assigned to the call characteristics may include but are not limited to: (i) friend; (ii) colleague; (iii) local call; (iv) work hours call; (v) home hours call; (vi) social contact call; (vii) recent activity call; (viii) frequent caller; and/or (ix) blocked caller.

Processing proceeds to step S280 where status mod 380 determines a call status of the incoming call. In this example, A most frequently appearing indicator is the basis for the assigned call status. Assignment is achieved by looking up indicators in responsive action database 306 where corresponding call statuses are recorded. Call statuses include, but are not limited to: (i) do not disturb; (ii) personal friends only; (iii) colleagues only; (iv) receiving calls generally; (v) user-listed callers only; and/or (vi) social contacts only.

Some embodiments of the present invention apply the common characteristics to a decision tree or response model to determine a call status. Additional characteristics may be considered for determining a call status. User-centric analysis may be applied to determine whether the user is prepared to receive a call. For example, the user-centric analysis may look to physical activity data of the user such as walking, running, sitting, and/or driving to determine a call status. Other user activity data may serve to determine a call status such as current location of the user, at home, at work, in-transit to work or to home. Alternatively, a calendar identifying meetings and events attended by the user is referenced such as calendar 105 (FIG. 1). In that way, call status is assigned, at least in part, on whether the user is scheduled for an event related to the incoming call characteristics, is associated with an assigned indicator, or the assigned status allows for the call during the scheduled event.

Processing ends at step S285, where responsive action mod 385 takes a responsive action corresponding to the call status. In this example, the call status is applied to responsive action database 306 (FIG. 1) to determine a corresponding responsive action where the responsive action is one of hang up, forward to voicemail, send incoming call to the user, and/or reply with a pre-defined SMS or text message. As discussed in detail below, various responsive actions may be appropriate in view of one or another common characteristic. Complex modeling techniques may be applied to identified common characteristics to make a responsive action decision.

Further embodiments of the present invention are discussed in the paragraphs that follow and later with reference to FIGS. 4-8. Some embodiments of the present invention are directed to a process including: (i) identifying an incoming call; (ii) handling call-related information by retrieving user data containing diversified information such as social relationships, third parties in common, location of the user, user behavior, and user preferences; (iii) mapping data (having varying formats) to a series of data model properties according to related content, the data being weighted intelligently to establish a data model where the data model changes as the circumstances and/or surroundings of the user change; (iv) analyze correspondence information in support of revising or creating context-responsive actions; (v) determine to take a context-responsive action based on currently-stated rules in the rules database; and (vi) prompt for and collect user feedback regarding the context-responsive action. In some embodiments of the present invention, the feedback relates to preferability of the context-responsive action in view of alternative context-responsive actions. Correspondence information refers to data collected during a call and/or upon declining a call along with time stamps, location data, and other environmental data occurring at the time of the call.

Some embodiments of the present invention are directed to processing incoming telephone calls intelligently on the basis of dynamically changing states of the associated users including user behaviors and preferences. The incoming calls are handled according to context-responsive actions including: allow the call to reach the user, reject the incoming call, and send the incoming call to a voicemail recorder. It should be noted that processing the incoming calls is not restricted to static caller lists or fixed responsive actions by caller phone number.

Some embodiments of the present invention are directed to the analysis of dynamic data including geographic information, user behavior, and user demand. In that way, the anti-disturb rules handle incoming calls intelligently and reflect real-time circumstances and preferences of the user with reference to call data, social network data, travel data, and/or online activity data.

Some embodiments of the present invention are directed to a way to analyze a set of information to identify whether or not an incoming call is wanted, then determine to accept or deny the incoming all. The set of information is derived from not only call data, but also social data, travel data, etc. Thus, the set of information used to predict whether the coming calls is wanted includes more than mere caller data, such as phone number and caller ID information. The source data on which the context-responsive action is taken include daily interaction data such as online shopping history, social media activity, user location, user calendar data, user behavior data, and internet search data.

Some embodiments of the present invention analyze daily interaction data periodically to update and/or create context-responsive rules for certain callers.

According to some embodiments of the present invention, the context-responsive rules are continuously updated in a context-responsive model developed through machine learning applied to voice data of calls received and initiated by the user. As the input data is generated, the context-responsive model is updated to support dynamically changing needs of the user.

Some embodiments of the present invention are directed to a method that includes generating a data model dynamically while weighting schemes in the data model are adjusted automatically according to current environmental scenarios. Some embodiments of the present invention include different data models and different analyzers for processing according to the current circumstances of the user.

Some embodiments of the present invention continuously analyze historical data and apply self-learning that leads to a judging rule update. The judging rule being a context-responsive rule for determining how to handle an incoming call. In some embodiments, by continuously accepting and analyzing user feedback (direct or indirect) the judging rule is still further updated according to the specific needs of the user.

Some embodiments of the present invention are directed to a method where user data (such as social data and behavior data) is collected automatically and clustered to generate new data properties dynamically when data is not mapping to existing data properties. In that way a user data model is kept current. According to some embodiments, the weight of an attribute is changing intelligently under different scenarios in a data model and a different analyzer is invoked dynamically to analyze data mapping to different data models.

Some embodiments of the present invention are directed to a method to create, refine, and update anti-disturb rules intelligently by self-learning on the basis of historical data (such as individual behavior data and social data) and individual feedback.

Some embodiments of the present invention cluster data collected from social media activity, other online activity, behavior monitoring, and purchasing data to generate new data properties dynamically when data does not map to existing data properties, in that way the data model is updated continually.

Some embodiments of the present invention are directed to predicting whether an incoming call is of interest to the user and making subsequent decisions responsive to the incoming call including: (i) reject call; (ii) allow call to reach the user; (iii) send the call to voicemail; and (iv) reply with automated text.

Figure 4:
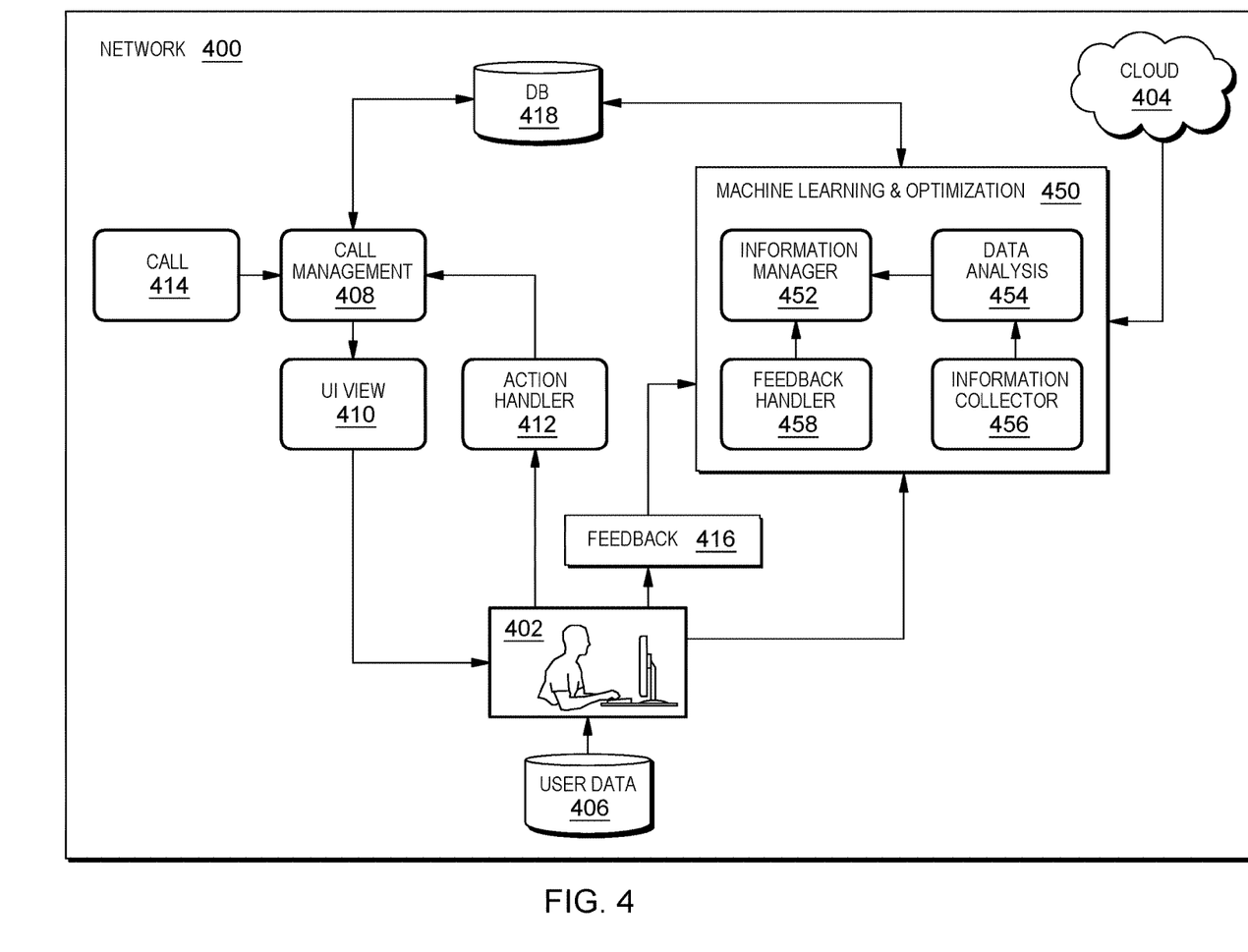
FIG. 4 is a block diagram view of a second embodiment of a system according to the present invention.

FIG. 4 shows architecture 400 of a networked computer system that includes machine learning module 450 and the general processing flow of the system according to some embodiments of the present invention. The system includes data sources 404, 406, and user 402, processing logic (call management 408, user interface view 410, action handler 412, and call module 414), machine learning and optimization module 450 (information manager 452, data analysis module 454, information collector module 456, and feedback handler 458), feedback module 416, and responsive action database 418 where processing data is stored including, for example, historical data, analysis results data, source information, and input data.

There are three main areas where programming logic is applied according to the architecture of FIG. 4. First, data analysis logic is applied to search the information related to the phone number from the third party such as cloud network 404 or other connected networks and databases, analyze it, and store the analysis results in database 418. The processing result is divided into two parts, one part is the related data of the phone number associated with the incoming call, such as location, source, relationship with the use, confidence level, and applied context rules, and another part is the content of the rule, such as automatic rejection or pass the call to a voicemail account. The outcome and/or analysis results are stored in the historical call record so the user may check and confirm the operation, or recommend connecting the call, ring repeatedly, and otherwise handle the call.

The second area is incoming call processing. Query the analysis results of the phone number from the database (if the analysis results of the phone number do not exist in the database, processing logic is executed to analyze data in real time), then display the information to the user and recommend operations. For different levels of trust (confidence level), the corresponding rules are automatically invoked for processing, such as automatically rejecting low-trust calls. The confidence level and context rules can be set by the user or set according to the common algorithm of machine learning. These can also be modified and/or dynamically changed.

Finally, the third area is feedback processing. Users can make corrections to the analysis results, such as feeding back an automatic number rejection operation, adding exceptions, adding custom rules, and so on. After that, the machine learning module retrains and optimizes the decision model based on these feedbacks, finally update the analysis results.

Figure 5:
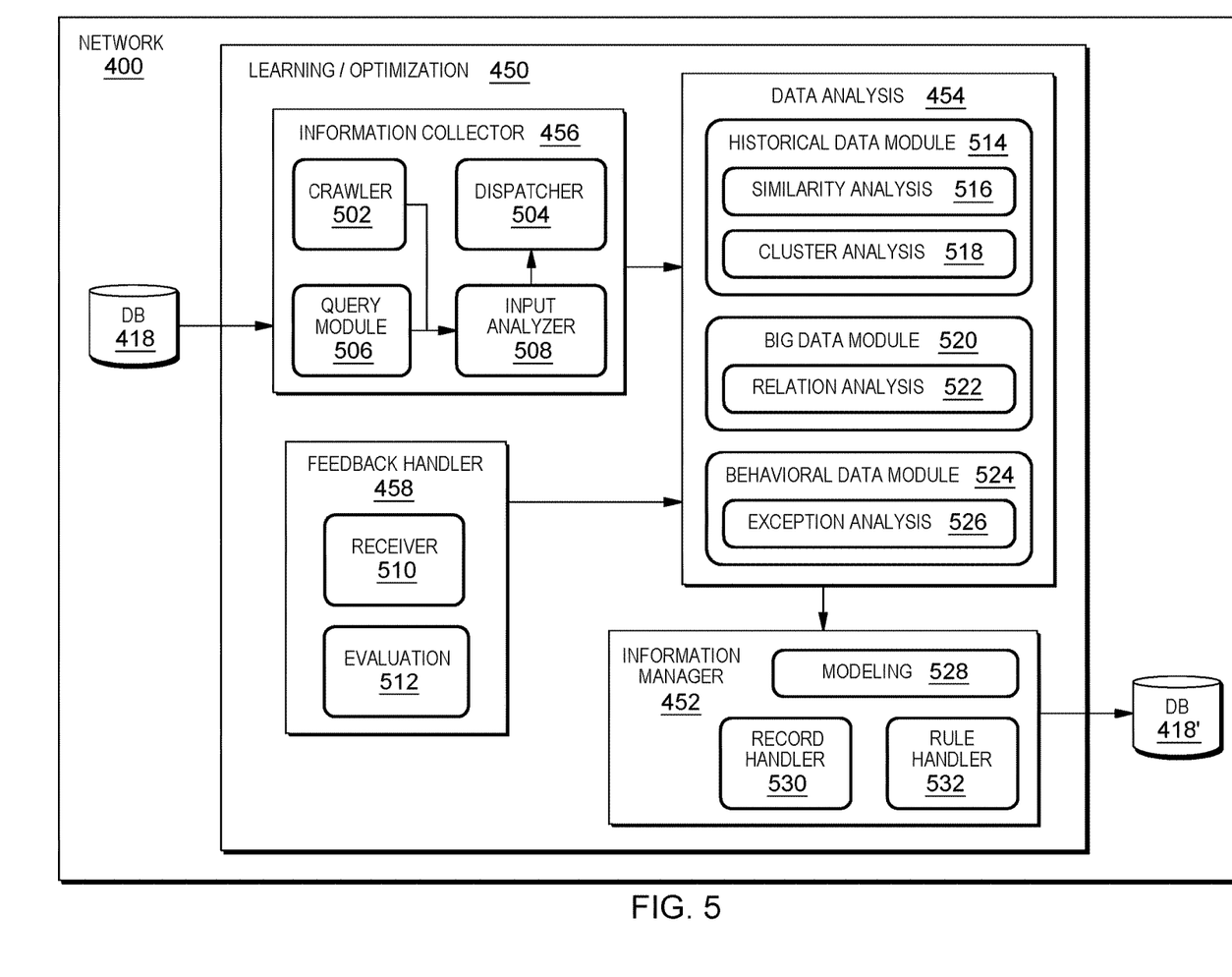
FIG. 5 is a block diagram view of a first machine learning portion of the second embodiment system according to the present invention.
Figure 6:
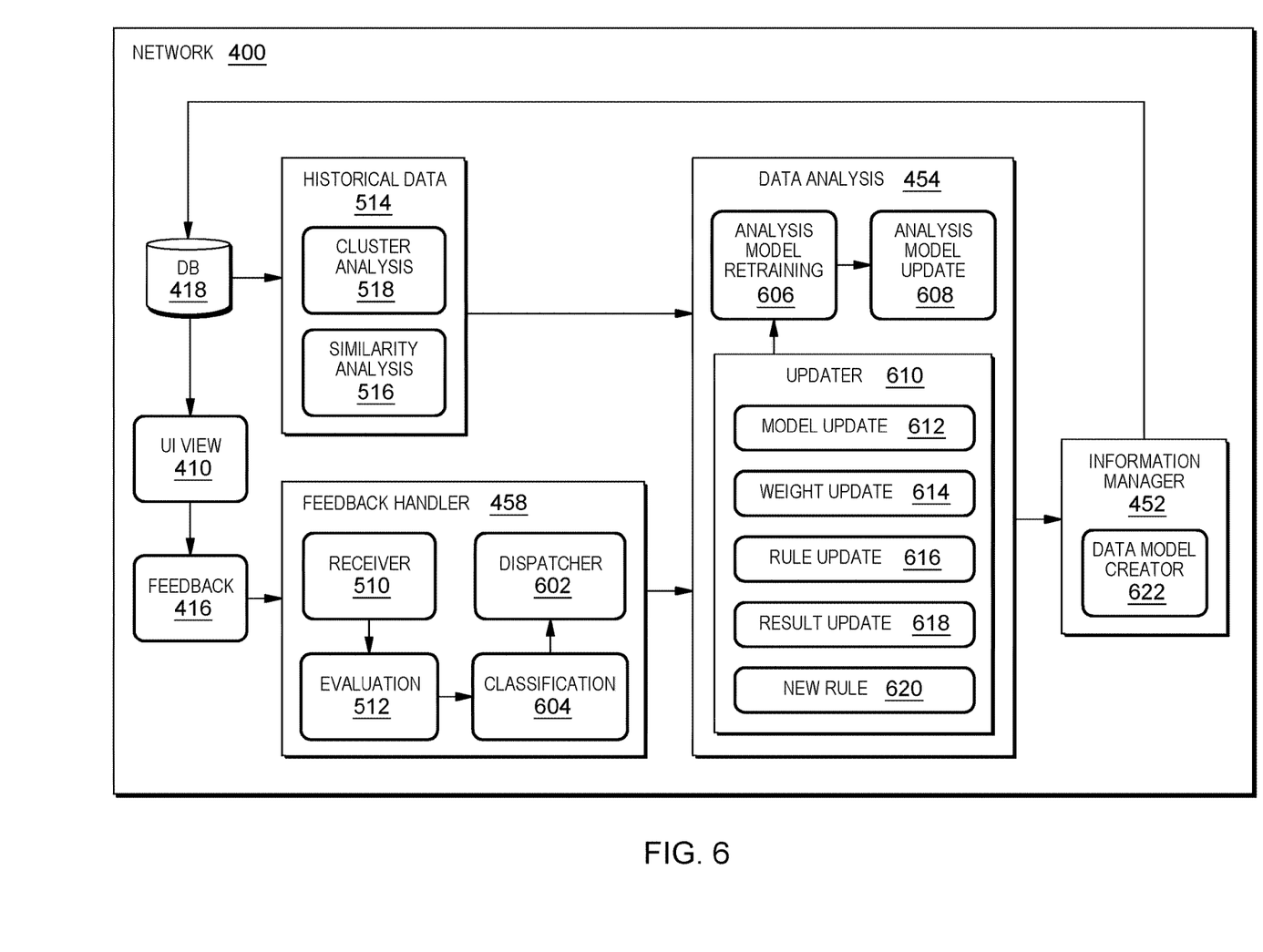
FIG. 6 is a block diagram view of a second machine learning portion of the second embodiment system according to the present invention.

FIG. 5 describes certain steps of machine learning mod 450 and the data model used for responding to an incoming call. This process is suitable for both obtaining data from external data sources and analyzing historical data. It can also be used for real-time analysis of incoming call related data. FIG. 6 also describes content of the machine learning portion of some embodiments of the present invention. Specifically, FIG. 6 describes detailed processing steps using historical data and feedback data. Some embodiments of the present invention perform the detailed processing steps as a time-triggered task.

Referring now to FIG. 5, inputs and outputs of the machine learning process are depicted. The source and type of input data are dictated by information collector 456. In this example, the source and type of input data are collected and stored in database 418 via query module 506, crawler mod 502 that searches internet sources including social media data. Collected information is processed by input analyzer 508 and dispatched by dispatcher module 504. Data analysis engine 454 processes the collected data according to source and type of data include social data processed by big data module 520 including relation analysis module 522; behavioral data processed by behavioral data module 524 including exception analysis module 526; and historical data from database 418 (modified in the depicted process steps as 418' when optimized with new data insights) processed by historical data module 514 including similarity analysis module 516 and cluster analysis module 518. The system further includes configuration information managed by information manager 452 via modeling module 528; feedback provided by the user processed by feedback handler 458 including receiver module 510 and evaluation module 512; and user-defined rules handled by information manager 452 including record handler 530 and rule handler 532. Output data includes analysis results of the phone number associated with the incoming call and the updated rule model.

The process performed by learning and optimization module 450 can be divided into three sub-parts, or sub-modules, as follows. First, the data collection process operates to classify and analyze the collected data, then match the specified data model as input for processing so as to facilitate the analysis by calling for corresponding analysis methods. Second, the feedback process including direct adjustment of the analysis results and the addition of custom data. The objective of the module is to analyze, calculate, and classify the received feedback information, and then decide whether the next step is to directly modify the analysis results or perform model optimization and re-analysis.

Finally, the third sub-part is analytical processing where built-in historical data analysis, big data analysis, and behavior analysis. The three analysis modes are implemented because a phone number may have multiple dimensions of relevant information. The multiple analysis methods are used according to the attributes of the input model to get the most accurate results.

Referring now to FIG. 6, where the detailed processing of historical data via historical data module 514 including cluster analysis module 518 and similarity analysis module 516 and feedback via feedback handler 458 including receiver module 510, evaluation module 512, classification module 604, and dispatcher module 602 process inputs for data analysis module 454 including analysis model retraining module 606 and analysis model update module 608. The model retraining module receives training data and other updates from updater module 610 including model update module 612, weight update module 614, rule update module 616, result update module 618, and new rule module 620.

Data analysis includes two aspects as illustrated in FIG. 6. The two aspects are historical data analysis and feedback data analysis. Historical data analysis involves querying historical data captured periodically, such as every 24 hours, using cluster analysis and similarity analysis to find specific rules based on related data of phone numbers calling in to the user. The optimization analysis results and rules are updated based on the analysis. Historical data analysis of a telephone number from which unwanted calls are coming includes a certain number of segments. The phone number is marked as an unwanted call each day for a while and then is marked as an unwanted call many times per day. When a previously unidentified telephone number is responsible for an incoming call but matches many of the number segments of the number making many unwanted calls may also be deemed as making an unwanted call based on the similarity of the unidentified telephone number to the number making the unwanted calls. As an example, the segments are an area code of the phone number.

Feedback data analysis involves analyzing and classifying feedback data. When the analysis leads to a modified analysis result, the corresponding result data is updated according to the process and system described in FIG. 5 with respect to updated database 418. For example, the confidence level of one telephone number is adjusted from low to high. If it is a user behavior that does not meet the recommended operation, the model will update and optimize the analysis model automatically, then reanalyze again. For example, one user effectively dials back one phone number which is marked as a harassing call in the blacklist (the effective call duration is more than 10 seconds). This phone number needs to be removed from the blacklist and the corresponding rules are updated, and the call is no longer automatically rejected. Accordingly, in some embodiments of the present invention, the confidence level associated with a particular phone number may change as a dynamic value. In one example, when a user moves from one calling area to another calling area (having a particular area code), the area code from where the user moved will gradually be more likely to be designated as an unwanted call characteristic.

Figure 7:
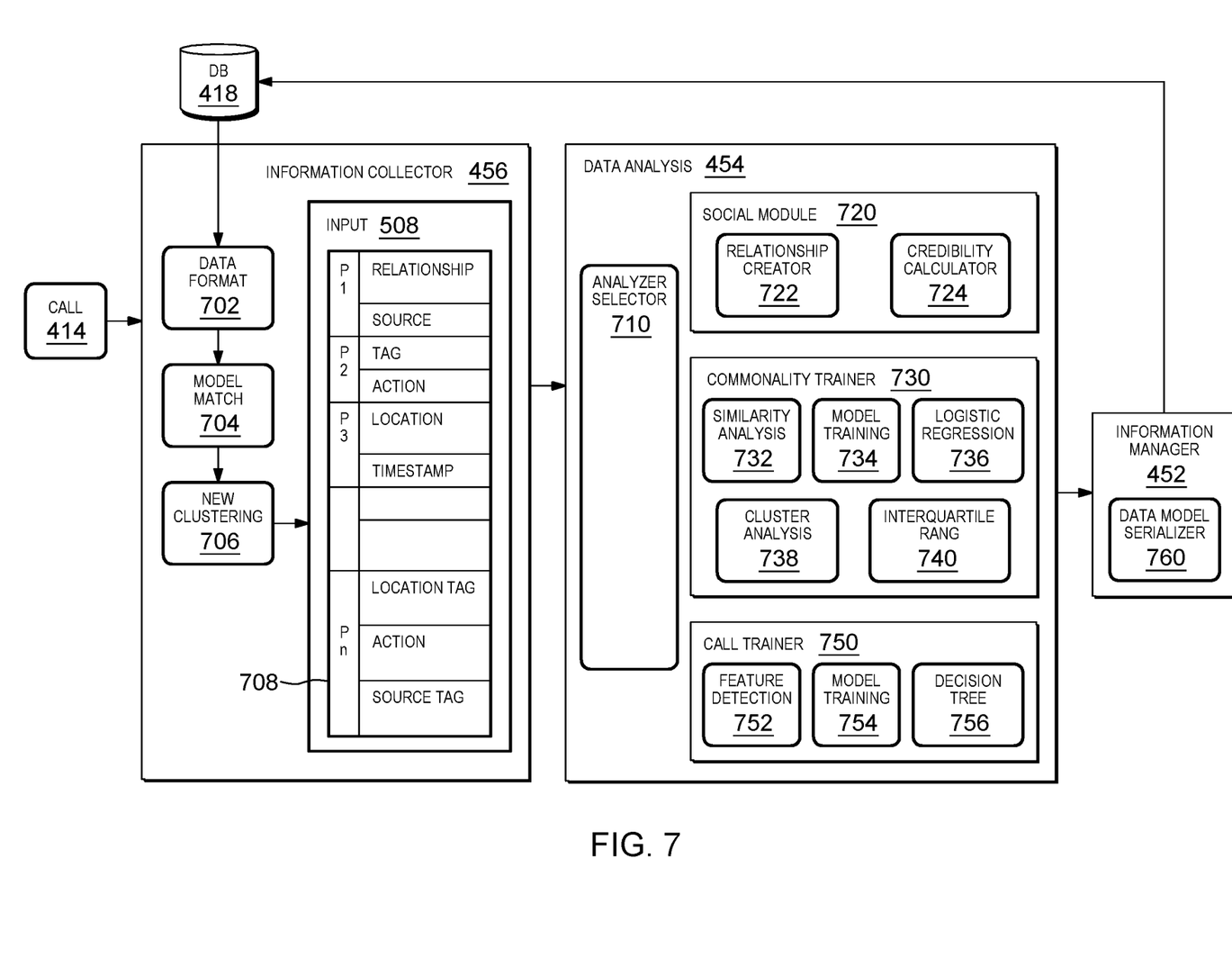
FIG. 7 is a block diagram view of a first analysis portion of the second embodiment system according to the present invention.

FIG. 7 shows aspects of architecture 400 of a networked computer system according to some embodiments of the present invention where data related to a phone number is processed. Call module 414 intercepts incoming calls for which call information is collected by information collector 456 including data format module 702, model match module 704, new clustering module 706, input analyzer 508, and attribute table 708. Collected information is communicated to data analysis module 454 including analyzer selector module 710, social module 720, relationship creator 722, credibility calculator module 724, commonality trainer 730, similarity analysis module 732, model training module 734, logistic regression module 736, cluster analysis module 738, interquartile range module 740, call trainer 750, feature detection module 752, model training module 754, and decision tree module 756. analysis results are communicated to information manager 452 including data model serializer 760 and stored in responsive action database 418.

Processing of data related to phone numbers includes formatting the captured phone number data and model matching is performed for various types of data captured. According to attribute table 708, each record that matches a corresponding set of attributes identified with a "P" prefix is provided as an input model for data analysis module 454. Alternatively, individual attributes are identified and communicated to the data analysis module. Attributes include relationship, source, tag, location, timestamp, and action. According, dynamically generation of the attributes contained in the input data model is performed and the weight of each attribute is established. The data analysis module analyzes the input data using the various analysis modules. The attributes are matched with existing database records and/or analyzed for additional attributes. The analysis results of the called analysis method are reported according to a pre-defined attribute weight for each relevant attribute.

For example, the information related to a phone number is formatted for processing. There are two records, which may match the P1 and P2 attributes of the data model. The data model for the phone number has two attributes P1 and P2, and the weights of P1 and P2 are W1 and W2 respectively in the corresponding data model. The next step is to use one analysis method, a, associated with attribute P1, and another analysis method, b, associated with attribute P2. Finally, performing an integration for the results of method a and method b with the weights (W1, W2) for attributes P1 and P2 as the final result.

Another example, the information related to another phone number is formatted for processing. There are three records, which may match the P2 and P3 attributes of the data model. The data containing location information has no matching attribute, so it is defined as matching the attribute Pn and the weights of these attributes in the data model are W2, W3 and Wn. The next step is to use the available analysis methods that correspond to the identified attributes. Finally, performing an integration for the results of the methods with the corresponding weights (W2, W3 and Wn) for attributes P2 and P3 as the final analysis result. The final analysis result is obtained.

Figure 8:
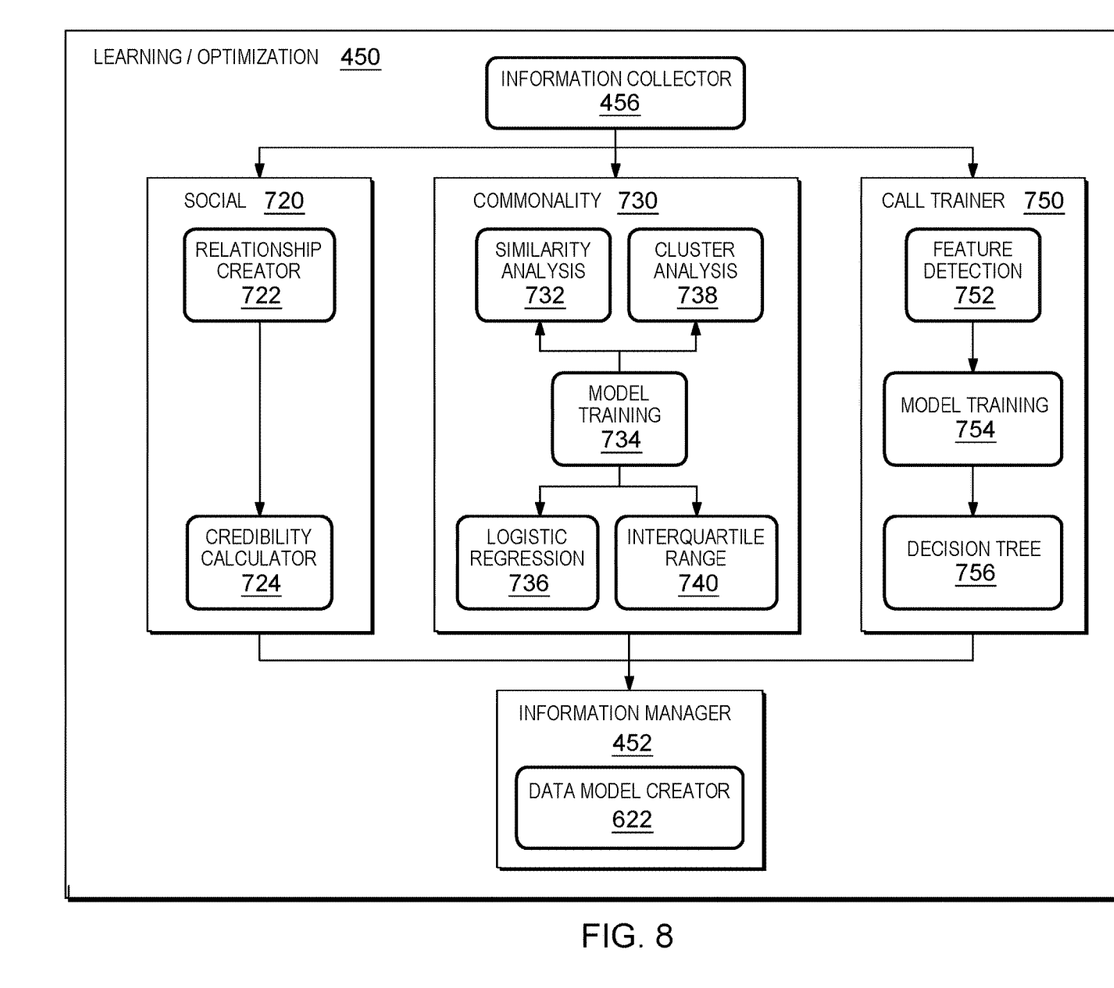
FIG. 8 is a block diagram view of a second analysis portion of the second embodiment system according to the present invention.

FIG. 8 shows details of the input and output sections of the data analysis portions of learning and optimization module 450.

Social module 720 receives formatted social and cloud data from information collector 456 for processing by relationship creator 722 and credibility calculator 724. A network topology is generated using the formatted data. Each point, or node, represents a phone number associated with a historic incoming call. Applying the following formula provides the closeness centrality value for each point on the topology map:

$$Cv = \frac{|V| - 1}{\sum_{t \neq v} d_{vi}}$$

where |V| is the number of nodes (telephone number count), and $d_{vi}$ is the shortest distance to another node. Essentially, this allows one to calculate how easy it is for a node to reach other nodes, that is, the reciprocal of the average of all other node distances. The result, Cv, represents the importance degree of the phone number in the network topology map of phone numbers for mapping the confidence level. Finally, the confidence level is mapped based on the degree of importance of each node.

Commonality trainer 730 analyzes phone number data according to certain common characteristics by deploying certain modules including similarity module 732, cluster analysis module 738, model training 734, logistic regression module 736, and interquartile range module 740.

Similarity analysis is performed on the input data to develop a sample data record that includes some items such as unwanted call determination, location, and rejection count. The sample data is used to determine certain parameters. Firstly, takes the formula of x, Ø as the input of function and hypothesis function $h\_\theta(x) = g(\theta^{\rightarrow} T x) = 1/(1 + e^{\hat{}}(-\theta^{\hat{}}T x))$. When y is 0 and 1, the corresponding probability distribution functions are respectively:

$$\{(p(y=1|x;\theta) = h\_\theta(x), \text{ and}$$

$$p(y=0|x;\theta) = [\![1-h]\!]\_\theta(x))\dashv$$

Integrate them to get the equation:

$$P(y|x\theta) = (h_\theta(x))^y (1-h_\theta(x))^{1-y}$$

This formula is useful in calculating the probability that an incoming telephone number calling from one place is an unwanted call. In some embodiments, the result is between 0 and 1, then zoom in 10 times to get the confidence level.

Logistic regression module 736 operates to train a model according to location and rejection count for mapping likelihood of originating an unwanted call. The equation of logistic regression model training is as follows:

$$G(z) = \frac{1}{1 + e^{-z}}$$

where Z is assumed to be the basic binary linear equation (ax+by), then location and rejection count are mapped to x and y. The G(z) is mapped as to whether a particular call is marked as an unwanted call. Accordingly, sample data is input into the model training process for reaching an analysis result.

Call trainer 750 analyzes historical data of a telephone number, querying collected information and historical data such as call duration and number of rejections of the specified telephone number, performing cluster analysis, and training the model to obtain the model MC, according to the rejection. The call trainer includes feature detection module 752, model training module 754, and decision tree module 756. The quartile deviation is used to obtain the value of the degree that the incoming call can be marked as an unwanted call through the normal distribution map of the phone number including connections count and the duration of the call. The upper and lower interval values can be set manually or according to the default value of the algorithm and can be modified later.

The decision tree module is engaged to determine whether or not an incoming call is unwanted when social module 720, commonality trainer 730 and other modules associated with the call trainer are indeterminate. The formula for the decision tree module is as follows:

$$\text{info}(D) = -\Sigma I - 1 mpi \log 2(pi),$$

where info(D) is the entropy of whole tree map, which calculates the expected value of all information that can lead to a determination of an unwanted incoming call. The smaller the expected information, the higher the level of trustworthiness. The term $P_i$ represents the probability of the expected results recorded at level i in the whole training tuple and can be estimated by dividing the number of elements belonging to this category by the total number of elements in the training tuple.

Further, a weighted average of the analysis results of multiple modules is processed according to the following equation:

$$\frac{\sum_{i=0}^{n} p^i w^j}{\sum_{i=0}^{n} w^j \sum_{s<t} \frac{n_{st}^i}{g_{st}}}$$

where P is the importance value of one attribute for other attributes, and W is the weight value of the attribute in the data model (i.e., the weight value of the corresponding attribute of the method). The $g_{st}$ is the result value (Confidence Level) of each method and the result using the equation is the final value of confidence level which is a weighted average of the calculated results from all methods.

Some embodiments of the present invention may include one, or more, of the following features, characteristics and/or advantages: (i) Source data collection cover more personal daily life aspects, not just make use of calling history or phone number marking service provided by third party; (ii) judging rule generation data model are always changing based on the input data, very flexible; (iii) the judging rule would be continuously updated by either self-learning results or manual intervention, not static; (iv) rejects calls based on current user behavior; (v) rejects calls based on current user location; (vi) analytics are employed to selectively reject calls according to current circumstances of a user; (vii) predicts whether the coming call is unwanted before allowing the incoming call; (viii) no need for third party interference with incoming calls; (ix) adjusts call filtering according to current user requirements based on a detected change in user behavior and detected change in user location; and/or (x) changes and/or adapts incoming call status according to owner circumstances without substantial human intervention.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for processing incoming calls, the method comprising:
   intercepting, by a processor, an incoming call by blocking the incoming call from reaching a user via a smart phone device;
   determining, by the processor, a set of characteristics of the incoming call;
   identifying, by the processor, a sub-set of characteristics within the set of characteristics relating to response modeling data stored in a database, the response modeling data collected from a set of historic calls answered by the user;
   assigning, by the processor, a call status to the incoming call based on the sub-set of characteristics; and
   taking a responsive action corresponding to the call status;
   wherein:
   the response modeling data includes social contacts information and online activity data.

2. The method of claim 1, wherein identifying characteristics includes:
   cross-referencing the set of characteristics with social media data.

3. The method of claim 1, wherein:
   the incoming call is received by the processor on the smart phone device; and
   the call status is one of a set of potential call statuses stored in a call status database;
   further comprising:
   processing the response modeling data generated by calls answered by the user including the set of characteristics; and
   modeling responses based on the response modeling data.

4. The method of claim 1, wherein the response modeling data includes physical activity data.

5. The method of claim 1, further comprising:
assigning an indicator to each characteristic of the sub-set of characteristics wherein indicators are pre-defined as being associated with specified characteristics.

6. The method of claim 4, where assigning the call status includes:
identifying a most frequently occurring indicator assigned to the sub-set of characteristics; and
assigning the call status according to the most frequently occurring indicator.

7. The method of claim 1, further comprising:
notifying the user of the responsive action taken with respect to the incoming call; and
collecting feedback from the user regarding preferability of the responsive action in view of alternative responsive actions.

8. A computer program product for processing incoming calls, the computer program product comprising a computer readable storage medium having stored thereon:
program instructions programmed to intercept an incoming call by blocking the incoming call from reaching a user via a smart phone device;
program instructions programmed to determine a set of characteristics of the incoming call;
program instructions programmed to identify a sub-set of characteristics within the set of characteristics relating to response modeling data stored in a database, the response modeling data collected from a set of historic calls answered by the user;
program instructions programmed to assign a call status to the incoming call based on the sub-set of characteristics; and
program instructions programmed to take a responsive action corresponding to the call status;
wherein:
the response modeling data includes social contacts information and online activity data.

9. The computer program product of claim 8, wherein identifying characteristics includes:
cross-referencing the set of characteristics with social media data.

10. The computer program product of claim 8, wherein the response modeling data includes physical activity data.

11. The computer program product of claim 8, further stored thereon:
program instructions programmed to assign an indicator to each characteristic of the sub-set of characteristics wherein indicators are pre-defined as being associated with specified characteristics.

12. The computer program product of claim 11, where assigning the call status includes:
identifying a most frequently occurring indicator assigned to the sub-set of characteristics; and
assigning the call status according to the most frequently occurring indicator.

13. The computer program product of claim 8, further stored thereon:
program instructions programmed to notify the user of the responsive action taken with respect to the incoming call; and
program instructions programmed to collect feedback from the user regarding preferability of the responsive action in view of alternative responsive actions.

14. A computer system for processing incoming calls, the computer system comprising:
a processor set; and
a computer readable storage medium;
wherein:
the processor set is structured, located, connected, and/or programmed to run program instructions stored on the computer readable storage medium; and
the program instructions include:
program instructions programmed to intercept an incoming call by blocking the incoming call from reaching a user via a smart phone device;
program instructions programmed to determine a set of characteristics of the incoming call;
program instructions programmed to identify a sub-set of characteristics within the set of characteristics relating to response modeling data stored in a database, the response modeling data collected from a set of historic calls answered by the user;
program instructions programmed to assign a call status to the incoming call based on the sub-set of characteristics; and
program instructions programmed to take a responsive action corresponding to the call status;
wherein:
the response modeling data includes social contacts information and online activity data.

15. The computer system of claim 14, wherein identifying characteristics includes:
cross-referencing the set of characteristics with social media data.

16. The computer system of claim 14, wherein the response modeling data includes physical activity data.

17. The computer system of claim 14, further including:
program instructions programmed to assign an indicator to each characteristic of the sub-set of characteristics wherein indicators are pre-defined as being associated with specified characteristics.

18. The computer system of claim 17, where assigning the call status includes:
identifying a most frequently occurring indicator assigned to the sub-set of characteristics; and
assigning the call status according to the most frequently occurring indicator.

19. The computer system of claim 14, further including:
program instructions programmed to notify the user of the responsive action taken with respect to the incoming call; and
program instructions programmed to collect feedback from the user regarding preferability of the responsive action in view of alternative responsive actions.

20. The method of claim 1, further comprising:
performing data analysis on the set of historic calls answered by the user; and
storing data analysis results as the response modeling data.

* * * * *